G. J. HAKE.
HARROW.
APPLICATION FILED DEC. 5, 1908.

915,289.

Patented Mar. 16, 1909.

Witnesses

Inventor
G. J. Hake,

By

Attorneys

UNITED STATES PATENT OFFICE.

GEORGE J. HAKE, OF HOYLETON, ILLINOIS.

HARROW.

No. 915,289.  Specification of Letters Patent.  Patented March 16, 1909.

Application filed December 5, 1908.  Serial No. 466,131.

*To all whom it may concern:*

Be it known that I, GEORGE J. HAKE, citizen of the United States, residing at Hoyleton, in the county of Washington and State of Illinois, have invented certain new and useful Improvements in Harrows, of which the following is a specification.

This invention comprehends certain new and useful improvements in agricultural implements, and the object of the invention is a simple, durable and efficient construction of harrow which is susceptible of ready adjustment to the width of the strip of land that it is desired to work, which admits of a comparatively large area of ground being operated upon at one time, so as to reduce to a minimum the unnecessary reworking of the land from overlapping, and which possesses certain other advantages that will become at once apparent as the invention is hereinafter disclosed, over the ordinary devices of this character in general use.

With this and other objects in view that will more fully appear as the description proceeds, the invention consists in certain constructions and arrangements of the parts that I shall hereinafter fully describe, and then point out the novel features thereof in the appended claim.

Figure 1:
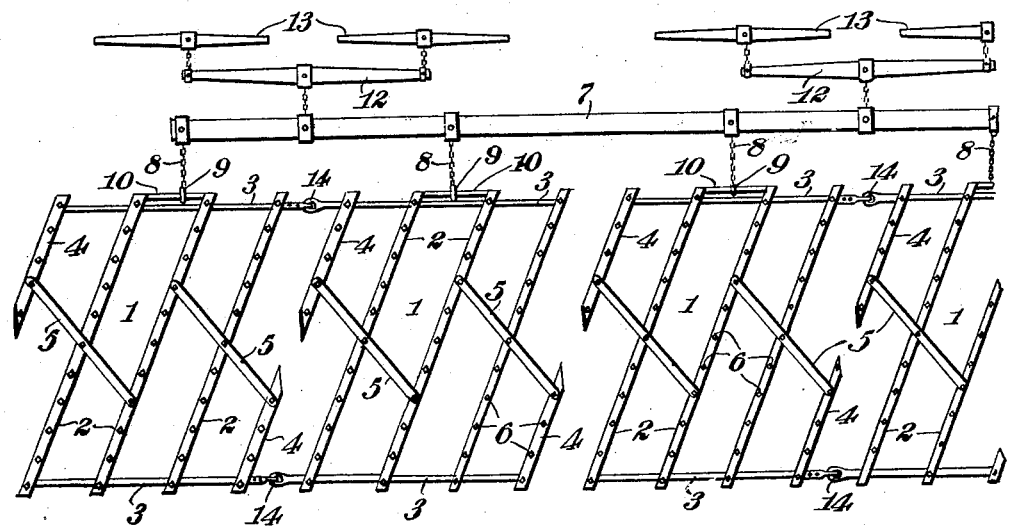
Figure 2:
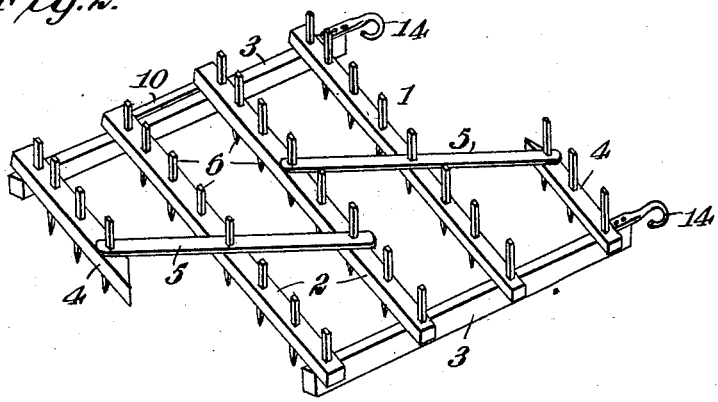

For a full understanding of the invention and the merits thereof, and to acquire a knowledge of the details of construction, reference is to be had to the following description and accompanying drawing, in which:

Figure 1 is a top plan view of a harrow constructed in accordance with my invention; and, Fig. 2 is a detail perspective view of one of the sections detached.

Corresponding and like parts are referred to in the following description and indicated in all the views of the drawing by the same reference characters.

My improved harrow consists essentially of a plurality of similar sections or frames 1, any desired number of which are arranged side by side, as illustrated in Fig. 1, and to all of which the draft is applied, in order to draw such sections over the land simultaneously. Each of the sections 1 consists of a plurality of substantially parallel beams 2 which are preferably equal in length and which are arranged diagonally, that is, at oblique angles with the line of draft. At their ends, these beams are connected together and maintained in proper spaced relation by means of front and rear cross bars 3 which are preferably disposed perpendicularly to the line of draft, and which project laterally beyond the extreme beams of the sections at diagonally opposite corners of the latter, as shown. Short beams 4 are located at the aforementioned diagonally opposite corners of the sections 1 and extend oppositely in parallel relation to the diagonal beams 2, and are secured at one end to corresponding projecting ends of the cross bars 3. The other ends of these short beams are connected to the two adjacent diagonal beams 2 through the instrumentality of braces 5 that extend obliquely oppositely to the beams 2, as shown. The beams 2 and the short beams 4 are equipped with harrow teeth 6 which may be of any desired or approved construction or design, and which are secured thereto at any suitable intervals. When the various harrow sections 2 are arranged side by side, as before described, it will be observed that inasmuch as the short beams 4 are positioned at diagonally opposite corners of the frames, the adjacent sections will overlap and the corresponding short beams will coöperate to eliminate any space between the sections, as would manifestly prevent the land from becoming thoroughly worked during the operation of the harrow.

In order to draw these sections over the ground simultaneously, I preferably employ a transverse draft bar 7 which is arranged in front of the sections, and is of such a length as to extend from one extreme section to the other, said draft bar being connected to the respective sections in any approved manner, as, for instance, by chains 8 carrying hooks 9 that are arranged for engagement with connecting bars 10 secured between the forward ends of adjacent beams 2 of each of the frames. It will be evident that I may employ any number of draft animals for dragging this harrow over the land, according to the number of sections used. In the present instance, I have illustrated the device as equipped for use with four horses, and have accordingly mounted upon the draft bar 7, two double-trees 12, each carrying a pair of swingle-trees 13. The adjacent harrow sections 2 may be connected together or not, according as desired, but it is manifest that this is not necessary, inasmuch as the respective sections are all connected with the draft bar 7. However, these sections may be arranged in pairs, and the adjacent sections hingedly connected together in any suitable manner, as, for instance, by interlocking hooks and eyes 14.

From the foregoing description, in connection with the accompanying drawing, it will be apparent that I have provided an improved harrow which may be readily adjusted according to the width of the strip of land to be worked, by attaching or detaching sundry harrow sections, which is simple, durable and efficient in construction and operation, and which consists of comparatively few parts that may be easily and cheaply manufactured and readily assembled.

Having thus described the invention, what I claim is:

A harrow comprising a plurality of like frames or sections arranged side by side and each consisting of a plurality of diagonal beams, cross bars connecting the beams and projecting laterally beyond the extreme beams at diagonally opposite corners of the frames, short beams disposed at such diagonally opposite corners of the frames and secured at one end to the corresponding projecting ends of the cross bars, braces connecting the other ends of the short beams to the adjacent diagonal beams, and harrow teeth secured to the diagonal beams and the short beams, the adjacent sections overlapping and the corresponding short beams coöperating, as and for the purpose specified.

In testimony whereof I affix my signature in presence of two witnesses.

GEORGE J. HAKE. [L. S.]

Witnesses:
 AUGUST SCHMALE,
 ALFRED HAKE.